(12) United States Patent
Liu et al.

(10) Patent No.: US 6,658,236 B1
(45) Date of Patent: Dec. 2, 2003

(54) WIRELESS APPARATUS WITH FREQUENCY SYNTHESIZERS

(75) Inventors: Ching-Chiang Liu, Taipei (TW); Hsiao-Ming Kuo, Taipei (TW)

(73) Assignee: GlobLink Technology Inc., Taipei (TW)

( * ) Notice: Subject to any disclaimer, the term of this patent is extended or adjusted under 35 U.S.C. 154(b) by 509 days.

(21) Appl. No.: 09/610,972

(22) Filed: Jul. 6, 2000

(30) Foreign Application Priority Data

Nov. 2, 1999 (TW) ................................. 88218632 U

(51) Int. Cl.⁷ ............................................... H04B 1/40
(52) U.S. Cl. ................... 455/76; 455/66.1; 455/39; 455/418; 455/419; 455/420; 455/352; 375/135; 375/136; 345/158; 345/159; 345/156; 345/157
(58) Field of Search ................. 455/66, 39, 418–420, 455/352; 345/158, 159, 156, 157, 163–166; 340/825.72, 825.69, 825.24; 700/83, 84, 85, 86; 375/135, 136

(56) References Cited

U.S. PATENT DOCUMENTS

| | | | | |
|---|---|---|---|---|
| 5,461,365 A | * | 10/1995 | Schlager et al. | 340/573.4 |
| 5,504,774 A | * | 4/1996 | Takai et al. | 375/134 |
| 5,590,417 A | * | 12/1996 | Rydbeck | 455/568 |
| 5,854,621 A | * | 12/1998 | Junod et al. | 345/158 |
| 5,881,366 A | * | 3/1999 | Bodenmann et al. | 455/66 |
| 5,943,625 A | * | 8/1999 | Yeom et al. | 455/557 |
| 6,072,468 A | * | 6/2000 | Hocker et al. | 345/157 |
| 6,138,050 A | * | 10/2000 | Schneider et al. | 700/84 |
| 6,223,029 B1 | * | 4/2001 | Stenman et al. | 455/420 |
| 6,230,214 B1 | * | 5/2001 | Liukkonen et al. | 710/1 |
| 6,246,376 B1 | * | 6/2001 | Bork et al. | 343/760 |
| 6,301,491 B1 | * | 10/2001 | Gong | 455/569 |
| 6,346,047 B1 | * | 2/2002 | Sobota et al. | 463/39 |
| 6,351,485 B1 | * | 2/2002 | Soe et al. | 375/130 |
| 6,434,187 B1 | * | 8/2002 | Beard et al. | 375/219 |
| 6,441,804 B1 | * | 8/2002 | Hsien | 345/158 |
| 6,507,763 B1 | * | 1/2003 | Schneider et al. | 700/84 |

FOREIGN PATENT DOCUMENTS

| | | | |
|---|---|---|---|
| EP | 171747 A2 | * | 2/1986 |
| GB | 2362545 A | * | 11/2001 |
| JP | 09152937 | * | 6/1997 |

* cited by examiner

*Primary Examiner*—Nguyen T. Vo
*Assistant Examiner*—Sujatha Sharma
(74) *Attorney, Agent, or Firm*—Bacon & Thomas, PLLC

(57) ABSTRACT

A wireless apparatus includes a transmitter and a receiver wherein each of the transmitter and the receiver includes a phase-locked loop (PLL) having a frequency synthesizer for generating a plurality of signals with identifications. The plurality of signals are combined to form spread spectrum modulated signals prior to transmitting from the transmitter. Correspondingly, the received signals in the receiver are converted into the original signals by the frequency synthesizer. With this, it is impossible for an unauthorized party to copy such signals, thereby providing a safe wireless communication environment to the user.

2 Claims, 3 Drawing Sheets

WIRELESS APPARATUS WITH FREQUENCY SYNTHESIZERS

FIELD OF THE INVENTION

The present invention relates to a wireless apparatus and mre particularly to a wireless apparatus with freequency synthesizers.

BACKGROUND OR THE INVENTION

Conventionally, a simple wireless communication system comprises a transmitter and a receiver having the same frequency as the transmitter for receiving the transmitted signals from the transmitter. For example, in a wireless mouse application, a signal is transmitted once the user clicks on the mouse. Then a receiver on the computer receives the same. Finally, the central processing unit (CPU) of the computer processes the received signal accordingly.

It is known that only a signal with fixed frequency is generated in a typical wireless transmitter by either the oscillation of an L/C circuit or the oscillation of an oscillating crystal. Such a single frequency signal is susceptible to unauthorized copying. Thus, it is impossible to provide a safe wireless communication environment to the user by such a typical wireless transmitter. This may cause a loss to the user. An improvement over the above design is to install a number of L/C circuits or oscillating crystals in the wireless transmitter for generating a number of signals with different frequencies.

But this is unsatisfactory for the purpose for which the invention is concerned for the following reason. It increases the size of the wireless transmitter. Inevitably, the size of mouse will also increase. This contradicts the compactness of a typical mouse. Also, there is little space available for the accommodation of such added circuits. In view of this, such technique is impractical.

SUMMARY OF THE INVENTION

It is an object of the present invention to provide a wireless apparatus comprising a transmitter and a receiver wherein each of the transmitter and the receiver includes a phase-locked loop (PLL) having a frequency synthesizer for generating a plurality of signals with identifications. Operating signals are combined with said plurality of signals to form said spread spectrum modulated signals prior to transmitting from the transmitter. Correspondingly, the received signals in the receiver are converted into the original signals by the frequency synthesizer in the receiver. With this, it is impossible for an unauthorized party to copy such signals, thereby providing a safe wireless communication environment to the use.

The above and other objects, features and advantages of the present invention will become apparent from the following detailed description taken with the accompanying drawings.

DETAILED DESCRIPTION OF THE PREFERRED EMBODIMENTS

Figure 1:
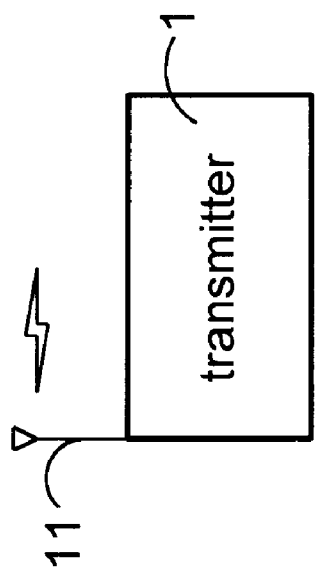
FIG. 1 is a view to schematically show a wireless apparatus according to the invention.
Figure 1:
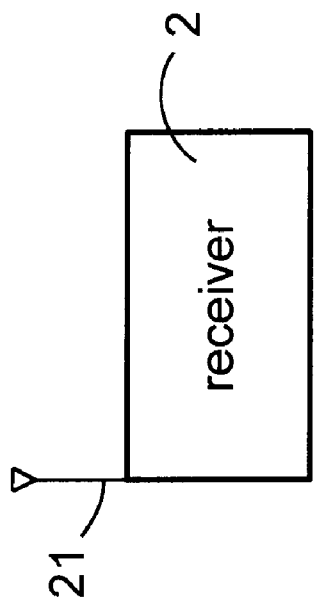

Referring to FIG. 1, there is shown a wireless apparatus constructed in accordance with the invention comprising a transmitter 1 having an antenna 11 for transmitting signals and a receiver 2 having an antenna 21 for receiving the signals sent from the transmitter 1.

Figure 2:
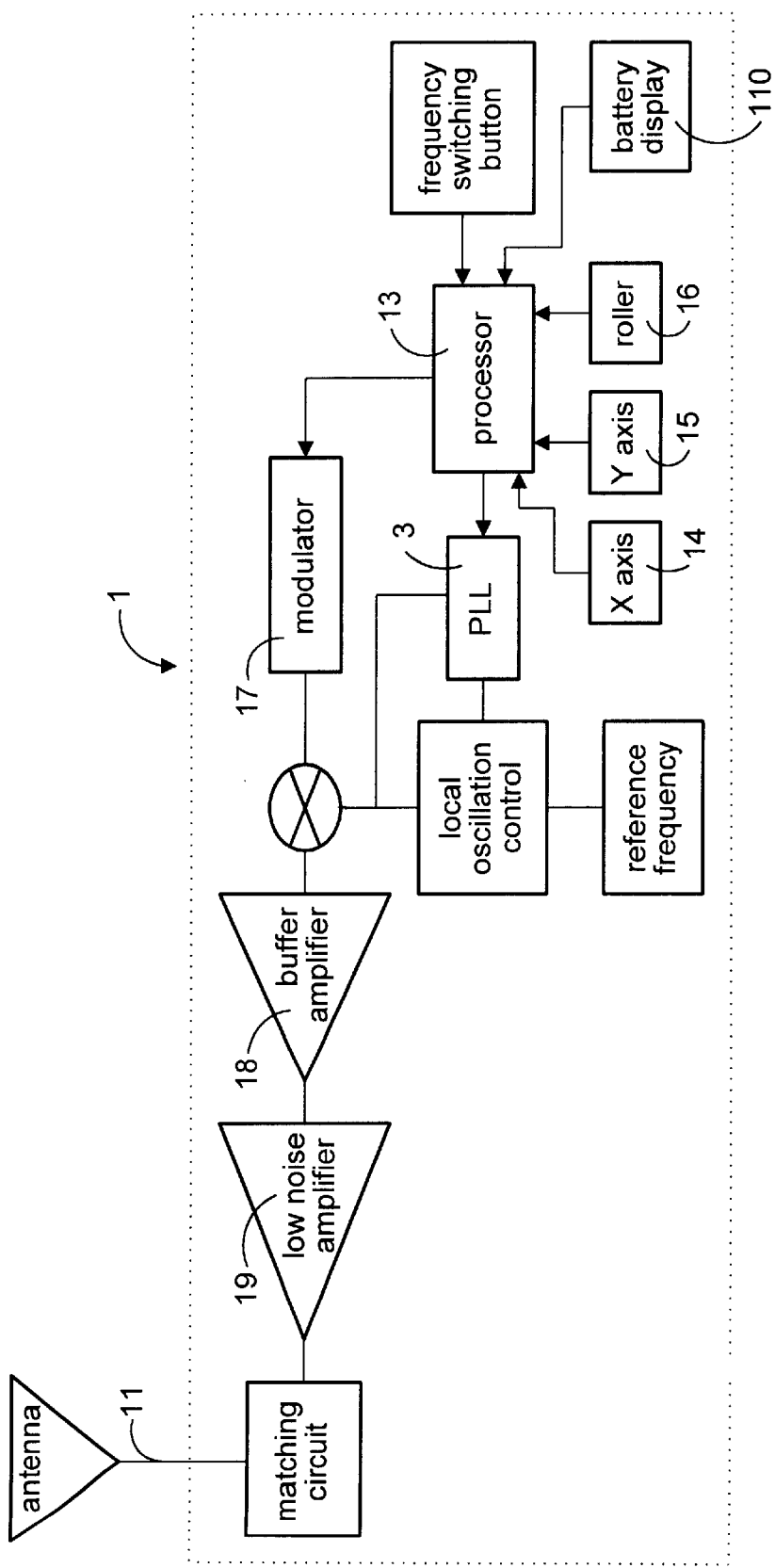
FIG. 2 is a block diagram showing the components of the transmitter of FIG. 1.

Referring to FIG. 2, transmitter 1 is mounted in a wireless mouse. It is appreciated by those skilled in the art that transmitter 1 may be mounted in a handset of a wireless telephone, a wireless keyboard, a wireless joystick, or a hand-free device of a mobile phone. Transmitter 1 comprises a processor 13 and a phase-locked loop (PLL) 3 connected to the processor 13 wherein the PLL 3 has a frequency synthesizer (not shown) for generating a plurality of signals with identifications. The movements of X axis 14, Y axis 15, and roller 16 of the mouse are converted into operating signals by the processor 13. Such signals are further modulated by modulator 17 and amplified by a buffer amplifier 18 and a low noise amplifier 19 prior to sending from the antenna 11.

Moreover, the original operating signals are also converted into spread spectrum modulated signals. Such new signals may be stored in the processor 13 As such. transmitter 1 may transmit the new signals in the next transmission. Further, the processor 13 is connected to a battery display 110. A "BATTERY TOO LOW" indication is displayed on the battery display 110 when the transmitter 1 is discharged to an inoperable level.

Figure 3:
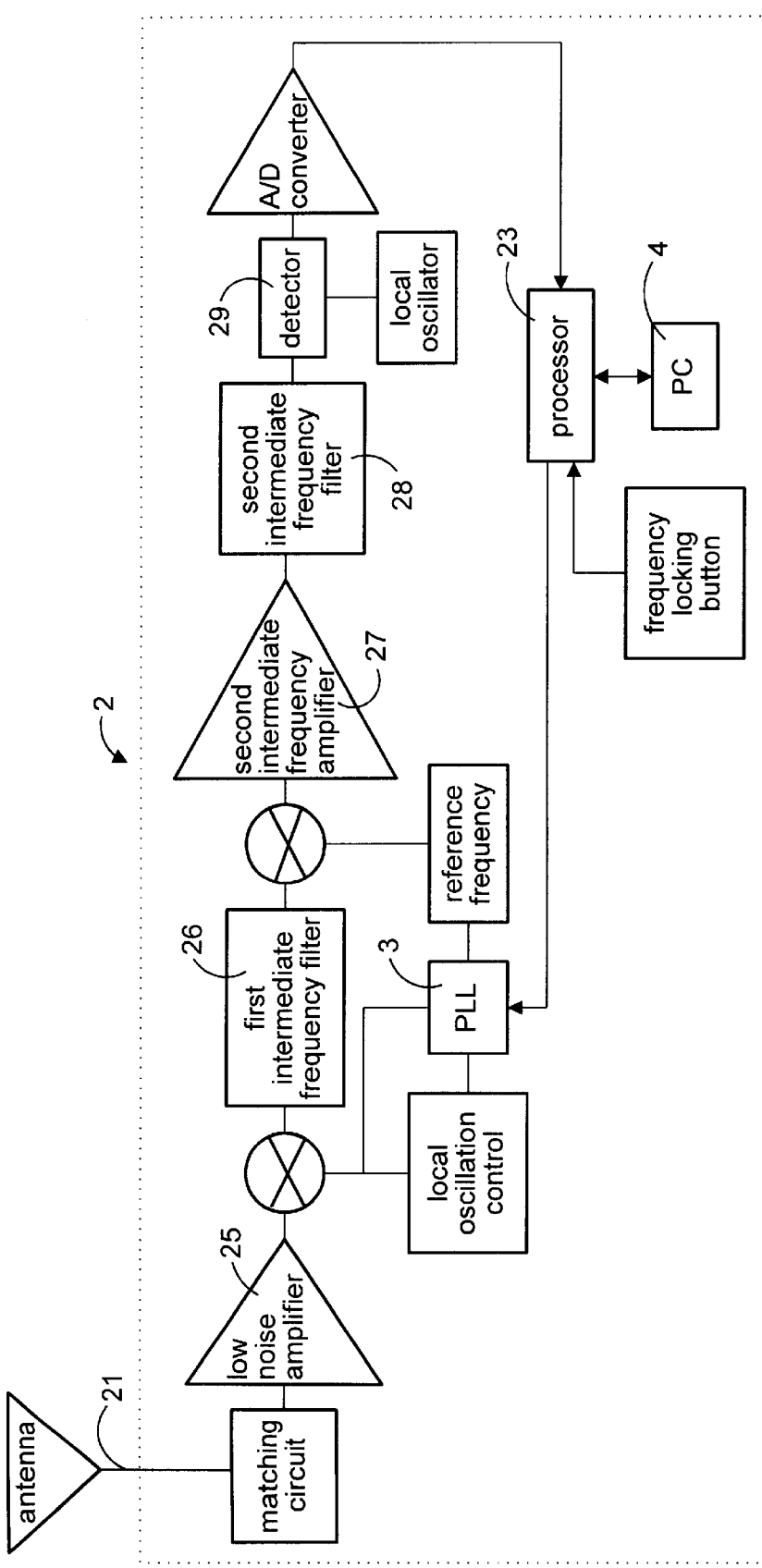
FIG. 3 is a block diagram showing the components of the receiver of FIG. 1.

Referring to FIG. 3, receiver 2 comprises a processor 23 connected to a computer (not shown). It is appreciated by those skilled in the art that processor 23 may be connected to a wireless telephone, an electronic game machine, or a handset. Processor 23 is connected to a PLL 3 having a frequency synthesizer (not shown). The operating signals sent from transmitter 1 are received by antenna 21 of receiver 2. The received signals are then amplified by a low noise amplifier 25, filtered by a first intermediate frequency filter 26, amplified by a second intermediate frequency amplifier 27 filtered by a second intermediate frequency filter 28, detected by a detector 29, and converted into digital signals by an A/D converter. Finally, such noise free signals are sent to processor 23 to process. The processed signals are further sent to a personal computer 4 to generate an action such as movement corresponding to the action of the mouse. In addition, processor 23 will command PLL 3 to convert the signals into ones having the same frequency as the original signals transmitted from transmitter 1 when the operating signals are determined by second processor 23 to have been combined with the plurality of signals with identifications generated by the frequency synthesizer of the transmitter PLL.

As a result, signals are converted into spread spectrum modulated signals by means of the frequency synthesizer prior to transmitting from the transmitter 1 to the receiver 2. Thus it is impossible for an unauthorized party to copy such signals, thereby providing a safe wireless communication environment to the user.

What is claimed is:

1. A wireless apparatus comprising:
   a transmitter including an antenna and a first phase-locked loop (PLL) having a first frequency synthesizer for generating a plurality of signals with identifications; and
   a receiver including an antenna and a second PLL having a second frequency synthesizer for generating signals having the same frequencies as the signals transmitted from the transmitter;
   wherein the plurality of signals are each converted into spread spectrum modulated signals prior to transmitting from the transmitter for preventing unauthorized copying, wherein the transmitter is provided in a wireless mouse further including a modulator, a buffer amplifier, a low noise amplifier, and a first processor connected to the first PLL, the movements of the X axis, the Y axis, and the roller of the mouse are converted into operating signals by the first processor, and the operating signals are modulated by the modulator, combined with said plurality of signals generated by the first frequency synthesizer to form said spread spectrum modulated signals, and amplified by the buffer amplifier and the low noise amplifier prior to sending from the antenna of the transmitter, and wherein the receiver further includes a second low noise amplifier, a first intermediate frequency filter, a second intermediate frequency amplifier, a second intermediate frequency filter, a detector, an analog to digital (A/D) converter, and a second processor connected to a personal computer (PC) and the second PLL respectively, the spread spectrum modulated signals sent by the transmitter are received by the antenna of the receiver, amplified by the second low noise amplifier, filtered by the first intermediate frequency filter, amplified by the second intermediate frequency amplifier, filtered by the second intermediate frequency filter, detected by the detector, and converted into digital signals by the A/D converter prior to sending to the second processor to process, the processed signals are sent to the PC to generate an action corresponding to the action of the mouse, and the second processor commands the second PLL to demodulate the spread spectrum modulated signals into signals having the same frequency as the original signals transmitted from the transmitter when the operating signals are determined by the second processor to have been combined with the plurality of signals with identifications.

2. The wireless apparatus of claim 1, wherein the transmitter further includes a battery display connected to the first processor for showing a warning on the battery display when the transmitter is discharged to an inoperable level.

* * * * *